United States Patent
Sugimoto et al.

(10) Patent No.: US 7,132,211 B2
(45) Date of Patent: Nov. 7, 2006

(54) METHOD FOR DEVELOPING AN ELECTROSTATIC LATENT IMAGE

(75) Inventors: Hiroko Sugimoto, Osaka (JP); Takashi Nagai, Osaka (JP); Toru Takatsuna, Osaka (JP); Seiji Kikushima, Osaka (JP)

(73) Assignee: Kyocera Mita Corporation, Osaka (JP)

(*) Notice: Subject to any disclaimer, the term of this patent is extended or adjusted under 35 U.S.C. 154(b) by 0 days.

(21) Appl. No.: 11/221,934

(22) Filed: Sep. 9, 2005

(65) Prior Publication Data

US 2006/0035162 A1    Feb. 16, 2006

Related U.S. Application Data

(60) Continuation of application No. 10/962,466, filed on Oct. 13, 2004, now abandoned, which is a division of application No. 10/218,054, filed on Aug. 15, 2002, now abandoned.

(30) Foreign Application Priority Data

Sep. 17, 2001   (JP) .............................. 2001-281592

(51) Int. Cl.
G03G 15/06   (2006.01)
G03G 15/09   (2006.01)

(52) U.S. Cl. .................. 430/120; 430/122; 399/274; 399/275; 399/276

(58) Field of Classification Search ................ 430/122, 430/120; 399/274, 275, 276
See application file for complete search history.

(56) References Cited

U.S. PATENT DOCUMENTS

| | | |
|---|---|---|
| 4,377,332 A | 3/1983 | Tamura |
| 4,868,083 A | 9/1989 | Nagatsuka et al. |
| 5,359,147 A | 10/1994 | Satoh |
| 6,021,295 A | 2/2000 | Ochiai et al. |
| 6,035,169 A | 3/2000 | Miyake et al. |
| 2003/0186151 A1 | 10/2003 | Nakayama et al. |

FOREIGN PATENT DOCUMENTS

| | | |
|---|---|---|
| JP | 57085060 A | 5/1982 |
| JP | 03131864 A | 6/1991 |

OTHER PUBLICATIONS

Klein, C. and C. Hurlbut. Manual of Mineralogy, 20th edition. New York: John Wiley & Sons (1985) pp. 310-311.

Grant, R et al., Chemical Dictionary. New York: McGraw-Hill, Inc. (1987) p. 349.

Diamond, Arthur S. (ed) Handbook of Imaging Materials, New York Marcel-Dekker, Inc. (1991) pp. 159-163 & 447-455.

*Primary Examiner*—Christopher Rodee
(74) *Attorney, Agent, or Firm*—Smith, Gambrell & Russell, LLP

(57) ABSTRACT

A magnetic toner contains, as a magnetic powder, magnetic iron oxide having an octahedral particle shape and an average particle diameter of 0.21 μm or larger and containing 18% or more by weight of FeO. The magnetic toner is so prepared as to have a bulk density A (g/cm$^3$) and a magnetic powder content B (% by weight) that fulfill the formulae $0.8 \leq A/B \times 100 \leq 1.6$ and $35 \leq B \leq 50$. This alleviates the reddishness of images produced with the magnetic toner, and alleviates the disturbance of a thin toner layer on a developing sleeve and thus the fogging resulting therefrom.

8 Claims, 1 Drawing Sheet

METHOD FOR DEVELOPING AN ELECTROSTATIC LATENT IMAGE

This is a continuation application of application Ser. No. 10/962,466 filed Oct. 13, 2004 (now abandoned), which is a division of application Ser. No. 10/218,054 filed Aug. 15, 2002, and abandoned on Feb. 11, 2004.

BACKGROUND OF THE INVENTION

1. Field of the Invention

The present invention relates to a magnetic toner, and to a developing apparatus and an image forming apparatus using such a magnetic toner.

2. Description of the Prior Art

Toners for use in the development of electrostatic latent images are roughly grouped into non-magnetic and magnetic toners. In image development, non-magnetic toners are usually used in the form of two-component developers, i.e., mixed with a carrier. Two-component developers maintain the electric charge of the toner stably, and thus offer satisfactory images for an extended period. However, they are susceptible to variations in the mixing ratio between the toner and the carrier and to deterioration of the carrier.

On the other hand, magnetic toners are usually used singly, i.e., in the form of one-component developers. One-component developers, containing no carrier, permit size and weight reduction of developing apparatus, and do not require maintenance such as replacement of the carrier. For these reasons, in recent years, magnetic toners have come to be used not only in low-speed, small-size copiers and printers but also medium- and high-speed copiers and printers.

Magnetic toners usually do not contain colorants, and their colors originate from magnetic powders. However, in general, magnetic powders are not purely black but reddish, making images developed with a magnetic toner appear reddish. That is, magnetic toners do not always offer a satisfactory tone of color.

The easiest way to alleviate this reddishness of images formed with a magnetic toner is to reduce the magnetic powder content of the toner. However, reducing the magnetic powder content of a toner results in reducing the coercivity of the toner, and thus leads to disturbance of a thin toner layer on a developer supporting member (hereinafter referred to as a "developing sleeve" also) and to increased toner adhesion in a non-image area (fogging).

SUMMARY OF THE INVENTION

An object of the present invention is to provide a magnetic toner that produces less reddish images with less disturbance of a thin toner layer on a developing sleeve and thus with reduced fogging resulting therefrom.

Another object of the present invention is to provide a developing apparatus and an image forming apparatus that produce less reddish images with reduced fogging.

To achieve the above objects, according to one aspect of the present invention, a magnetic toner contains, as a magnetic powder, magnetic iron oxide having an octahedral particle shape and an average particle diameter of 0.21 μm or larger and containing 18% or more by weight of FeO. Moreover, the magnetic toner is so prepared as to have a bulk density A (g/cm$^3$) and a magnetic powder content B (% by weight) that fulfill formulae (1) and (2) below. Prepared in this way, the magnetic toner produces less reddish images with less disturbance of a thin toner layer on a developing sleeve and thus with less fogging resulting therefrom.

$$0.8 \leq A/B \times 100 \leq 1.6 \quad (1)$$

$$35 \leq B \leq 50 \quad (2)$$

To achieve the above objects, according to another aspect of the present invention, in a developing apparatus and an image forming apparatus, a developing blade is provided that is fitted with a magnet having a magnetic force of 400 to 800 gausses, and a magnetic toner as described above is used as a developer. This makes it possible to produce less reddish images with less fogging.

BRIEF DESCRIPTION OF THE DRAWINGS

This and other objects and features of the present invention will become clear from the following description, taken in conjunction with the preferred embodiments with reference to the accompanying drawings in which.

DESCRIPTION OF THE PREFERRED EMBODIMENTS

Figure 1:
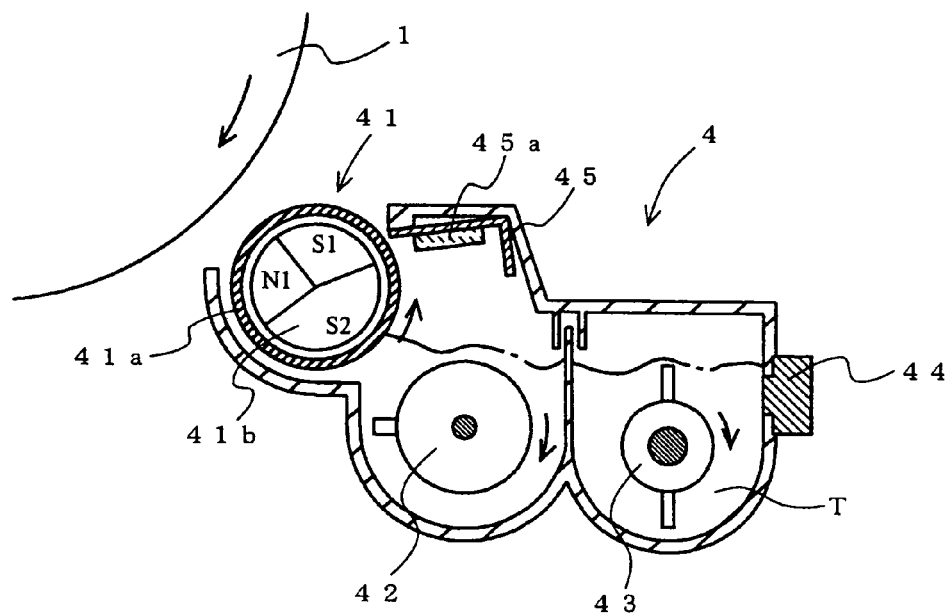
FIG. 1 is a sectional view showing an example of a developing apparatus according to the invention.

As a result of an intensive study made in search of a way to alleviate the reddishness of images produced with a magnetic toner without disturbing a thin toner layer on a developing sleeve, the inventors of the present invention have found out that the aim is achieved by using a particular, less reddish, type of magnetic powder and by preparing a magnetic toner so that its magnetic force and flowability fulfill a particular relationship, which findings have led to the present invention.

Specifically, one of the main features of a magnetic toner according to the invention is that it contains, as a magnetic powder, magnetic iron oxide having an octahedral particle shape and an average particle diameter of 0.21 μm or larger and containing 18% or more by weight of FeO.

First, the magnetic powder used in the invention will be described. The tone of color of a magnetic powder depends greatly on its particle diameter; specifically, a magnetic powder having an average particle diameter smaller than 0.21 μm appears distinctly reddish. Accordingly, in the invention, a magnetic powder having an average particle diameter of 0.21 μm or larger is used. There is no particular upper limit to the average particle diameter of the magnetic powder. However, an average particle diameter larger than 0.30 μm may result in too low coercivity, leading to increased fogging, and accordingly the average particle diameter of the magnetic powder is preferably 0.30 μm or smaller.

The tone of color of a magnetic powder depends also on its FeO content. A magnetic powder containing less than 18% by weight of FeO appears distinctly reddish. Accordingly, in the invention, a magnetic powder containing 18% or more by weight of FeO is used. A further preferred FeO content is 20% or more by weight.

The particle shape of the magnetic iron oxide affects not only the tone of color of the magnetic toner but also how easily the magnetic iron oxide unwantedly separates from toner particles. There are other types of magnetic iron oxide having different particle shapes such as spherical and cubic. The study by the inventors of the present invention, however, has shown that magnetic iron oxide with an octahedral particle shape surpasses other types in both blackness and unlikeliness to separate from toner particles. Accordingly, in the invention, magnetic iron oxide with an octahedral particle shape is used. The magnetic powder may be subjected to surface treatment using a silane coupler, a titanium-based coupler, or the like.

Another main feature of a magnetic toner according to the invention is that its bulk density and magnetic powder content fulfill formulae (1) and (2) noted earlier. Specifically, the magnetic toner has a lower magnetic powder content B than conventionally usual to alleviate its reddishness, and in addition, to prevent the resulting disturbance of a thin toner layer on a developing sleeve, is so prepared as to have a controlled flowability. Here, the bulk density of the toner is used as an index of its flowability. The higher the flowability of a toner, the higher its bulk density; the lower the flowability of a toner, the lower its bulk density.

As will be understood from formula (2), a preferred range of the magnetic powder content B is from 35 to 50% by weight. A magnetic powder content higher than 50% by weight results in distinct reddishness of the produced images and also in inadequate initial image density in a high-temperature, high-humidity environment. This is because, in a high-humidity environment, whereas the toner is charged with less electric charge, the high magnetic powder content increases the magnetic attraction by which the toner is attracted toward the developing sleeve. On the other hand, a magnetic powder content lower than 35% by weight results in fogging. This is because the low magnetic powder content of the toner lowers its coercivity and thus permits the toner to detach easily from the developing sleeve. A further preferred lower limit of the magnetic powder content is 40% by weight, and a further preferred upper limit thereof is 45% by weight.

It is also necessary that the bulk density A and the magnetic powder content B of the toner fulfill formula (1) noted earlier. Through a series of tests performed with different magnetic powder contents lower than conventionally usual, the inventors of the present invention found out that disturbance of a thin toner layer on a developing sleeve was particularly likely in a low-temperature, low-humidity environment. An extensive study in search of a way to prevent such disturbance of a thin toner layer on a developing sleeve led us to find out that the aim was achieved by increasing the magnetic powder content to such a degree as not to make the toner distinctly reddish and simultaneously making the bulk density of the toner, i.e., the index of its flowability, lower than usual. Then, under such conditions, we investigated the relationship between the magnetic powder content and the bulk density, and derived therefrom the inequality of formula (1). Falling out of the range defined by formula (1) beyond its lower limit results in fogging all over the produced image. On the other hand, falling out of the range defined by formula (1) beyond its upper limit results in disturbance of a thin toner layer on a developing sleeve, and thus in partial fogging in the produced image. To maintain adequate image density for an extended period, a further preferred lower limit of formula (1) is 1.0, and a further preferred upper limit thereof is 1.4.

The binder resin used in a toner according to the invention may be of any type, examples including styrene-acrylic resin and polyester resin. Needless to say, as required, these types of resin may be used in combination with another type of resin.

Examples of the monomers that are used as the base of the styrene-acrylic resin include: derivatives of styrene such as styrene, α-methylstyrene, p-methylstyrene, p-t-butylstyrene, p-chlorstyrene, and hydroxystyrene; and esters of (meth)acrylic acid such as methacrylic acid, methyl (meth)acrylate, ethyl (meth)acrylate, propyl (meth)acrylate, butyl (meth) acrylate, glycidyl (meth)acrylate, methoxyethyl (meth)acrylate, propoxyethyl (meth)acrylate, methoxydiethylene glycol (meth)acrylate, ethoxydiethylene glycol (meth)acrylate, benzil (meth)acrylate, cyclohexyl (meth)acrylate, tetrahydrofurfuryl (meth)acrylate, (meth)acrylonitrile, (meth)acrylamide, N-methylol (meth)acrylamide, ethylene glycol di(meth)acrylate, 1,3-butylene glycol di(meth)acrylate, 1,4-butanediol di(meth)acrylate, and trimethylol ethane tri (meth)acrylate.

A mixture of some of these monomers is made into the binder resin used in the invention by polymerizing the mixture by an appropriate process such as solution polymerization, block polymerization, emulsion polymerization, or suspension polymerization. In the polymerization process here, any conventionally known polymerization initiator can be used, examples including: acetyl peroxide, decanoyl peroxide, lauroyl peroxide, benzoyl peroxide, azobisisobutyronitrile, 2,2'-azobis-2,4-dimethylvaleronitrile, and 2,2'-azobis-4-methoxy-2,4-dimethylvaleronitrile. Preferably 0.1 to 15% by weight of one of these polymerization initiators is added to the total weight of the monomers.

The polyester resin is produced mainly through condensation polymerization of a polycarboxylic acid and a polyhydric alcohol. Examples of the polycarboxylic acid include: aromatic polycarboxylic acids such as phthalic acid, isophthalic acid, terephthalic acid, succinic acid, 1,2,4-benzenetricarboxylic acid, 2,5,7-naphthalenetricarboxylic acid, 1,2,4-naphthalenetricarboxylic acid, and pyromellitic acid; aliphatic dicarboxylic acids such as maleic acid, fumaric acid, succinic acid, adipic acid, sebacic acid, malonic acid, azelaic acid, mesaconic acid, citraconic acid, and glutaconic acid; alicyclic dicarboxylic acids such as cyclohexane dicarboxylic acid and cyclohexenedicarboxylic acid; and anhydrides and lower alkyl esters of these carboxylic acids. These are used singly or as a mixture of two or more of them.

Here, the content of components with three or more carboxyl or hydroxy groups depends on the degree of cross-linking, and therefore the desired degree of cross-linking can be achieved by controlling the amount of such components added. In general, a preferred content of components with three or more carboxyl or hydroxy groups is 15 mol % or lower.

On the other hand, examples of the polyhydric alcohol used in the polyester resin include: alkylene glycols such as ethylene glycol, 1,2-propylene glycol, 1,3-propylene glycol, 1,4-butanediol, 1,4-butenediol, neopentyl glycol, 1,5-pentane glycol, and 1,6-hexane glycol; alkylene ether glycols such as diethylene glycol, triethylene glycol, dipropylene glycol, polyethylene glycol, polypropylene glycol, and polytetramethylene glycol; alicyclic polyhydric alcohols such as 1,4-cyclohexame dimethanol and hydrogenated bisphenol A; and bisphenols such as bisphenol A, bisphenol F, and bisphenol S, and alkylene oxides of such bisphenols. These are used singly or as a mixture of two or more of them.

As required, monocarboxylic acids and monohydric alcohols may be used for the purpose of adjusting the molecular weight and controlling the reaction. Examples of monocarboxylic acids include benzoic acid, p-hydroxybenzoic acid, toluenecarboxylic acid, salicylic acid, acetic acid, propionic acid, and stearic acid. Examples of monohydric alcohols include benzil alcohol, toluene-4-methanol, and cyclohexane methanol.

It is preferable that the binder resin used have a glass transition point in the range from 45 to 90° C. With a glass transition point below 45° C., the binder resin may gather together inside a toner cartridge or a developing apparatus. On the other hand, with a glass transition point over 90° C., the toner may not fuse satisfactorily onto a transfer material such as paper.

As required, a magnetic toner according to the invention may contain a charge control agent, a mold release agent, a surface treatment agent, or the like. The charge control agent may be of any conventionally known type, examples including: as charge control agents that tend to be positively charged, nigrosine dyes, nigrosine dyes denatured with a fatty acid, nigrosine dyes denatured with a fatty acid containing a carboxyl group, quaternary ammonium salts, amine-based compounds, and organic metallic compounds; and, as charge control agents that tend to be negatively charged, metallic complexes of a hydroxycarboxylic acid, metallic complexes of an azo compound, metal complex dyes, and salicylic acid derivatives.

The mold release agent may be one of various types of wax or low-molecular-weight olefin resin. Examples of wax include: esters of a fatty acid with a polyhydric alcohol; esters of a fatty acid with a higher alcohol; amides of an alkylenebis fatty acid; and natural waxes. Examples of low-molecular-weight olefin resin include: polypropylene, polyethylene, and propylene-ethylene copolymer with a number-average molecular weight in the range from 1,000 to 10,000, in particular in the range from 2,000 to 6,000. Among these, polypropylene is particularly suitable.

The surface treatment agent may be any substance that improves the charge controllability and bulk density (flowability) of the toner, examples including: inorganic fine particle powder such as silica, alumina, titanium oxide, zinc oxide, magnesium oxide, and calcium carbonate; organic fine particle powder such as polymethyl methacrylate; and metallic salts of a fatty acid such as zinc stearate. These are used singly or as a mixture of two or more of them. Preferably 0.1 to 2.0% by weight of the surface treatment agent is added to the toner. The surface treatment agent is mixed with the toner, for example, in a Henschel mixer, V-blender, tumbler mixer, or hybridizer.

A magnetic toner according to the invention can be manufactured by a process that itself is conventionally known, such as crushing-and-classifying, melt granulation, spray granulation, or suspension/emulsification polymerization. Among these, from the viewpoint of manufacturing equipment and productivity, crushing-and-classifying is preferred. Crushing-and-classifying is performed in the following manner. First, a toner composition containing a binder resin and a magnetic powder, with a charge control agent, a mold release agent, and the like added thereto as required, is premixed in a Henschel mixer or a V-blender, and is then melt and kneaded in a melting-kneading machine such as a twin-screw extruder. The toner composition thus melted and kneaded is cooled, is then subjected to coarse/fine crushing, and is then, as required, classified to obtain toner particles having the desired particle size distribution. As required, the surfaces of the toner particles are treated with a surface treatment agent to finish the toner. The magnetic powder may be contained inside the toner particles, or may be made to adhere to the surfaces of the toner particles. The toner according to the invention may be used as it is as a one-component developer, or may be mixed with a carrier so as to be used as a two-component developer.

Next, a developing apparatus according to the invention will be described. The main features of a developing apparatus according to the invention are that a developing blade provided with a magnet having a magnetic force of 400 to 800 gausses is arranged at a predetermined distance from a developing sleeve, and that a magnetic toner prepared as described above is used as a developer. In this structure, even with a toner having a low magnetic powder content, it is possible to form a thin toner layer uniformly on the developing sleeve.

FIG. 1 is a sectional view showing an example of a developing apparatus according to the invention. This developing apparatus 4 is provided with a developing sleeve (developer supporting member) 41 composed of a sleeve 41a and a magnet 41b housed inside and fixed to it, a first agitating/transporting member 42 having a spiral shape, and a second agitating/transporting member 43 having a spiral shape. To the upper right of the developing sleeve 41, a developing blade 45 for restricting the amount of toner transported to a developing section and charging the toner with electric charge by friction is arranged at a predetermined distance from the developing sleeve 41. On the bottom surface of this developing blade 45, a magnet 45a having a predetermined magnetic force is fitted. On a side wall to the right of the second agitating/transporting member 43, a toner sensor 44 for detecting the amount of toner is arranged.

When the toner sensor 44 detects a shortage of the toner inside the developing apparatus 4, a fresh supply of toner T is fed from a toner hopper (not shown) to the developing apparatus 4. The supplied toner T is first transported, while being agitated, in the direction from the front side to the back side of the figure by the second agitating/transporting member 43, and is then, at the back-side end, fed from the second agitating/transporting member 43 to the first agitating/transporting member 42. The toner T is then transported, while being agitated, in the direction from the back side to the front side of the figure by the first agitating/transporting member 42, and meanwhile an appropriate amount of it is fed to the developing sleeve 41.

The toner T fed to the developing sleeve 41 is, as the developing sleeve 41 rotates counter-clockwise, fed to a position facing a photoconductor 1 (developing section). Meanwhile, the amount of toner fed to the developing section is controlled by the developing blade 45 arranged at a predetermined distance from the developing sleeve and magnetized by the magnet 45a, and simultaneously a thin layer of the toner is formed; moreover, the toner T is charged with electric charge by friction. Here, it is important that the magnet 45a have a magnetic force in the range from 400 to 800 gausses. A magnetic force weaker than 400 gausses may lead to failure to form a thin toner layer uniformly on the developing sleeve. On the other hand, a magnetic force stronger than 800 gausses may cause too small an amount of toner to be transported to the developing section. The distance between the developing sleeve 41 and the developing blade 45 is determined appropriately according to the particle diameter of the toner T and the magnetic forces of the magnets 41b and 45a. In general, a preferred range of this distance is from 0.2 to 0.4 mm.

To form a thin toner layer uniformly, it is preferable that the developing sleeve 41 have a surface roughness in the range from 3.0 to 5.5 μm. Giving the developing sleeve 41 a surface roughness of 3.0 μm or finer may lead to lower transportability of the toner T and to failure to form a thin toner layer uniformly. On the other hand, giving it a surface roughness of 5.5 μm or coarser may cause the toner T to lodge in depressions in the surface of the developing sleeve 41 and fuse onto the developing sleeve 41. A further preferred range of the surface roughness is from 3.5 to 4.5 μm.

The surface roughness of the developing sleeve can be controlled to within the aforementioned range, for example, by treating it by blasting. The desired surface roughness is obtained by appropriately selecting or adjusting the type of the blasted material, the pressure of compressed air, the duration of blasting, the distance from the blast nozzle to the developer supporting member, and other conditions. Examples of the blasted material used here include sand, glass beads, and steel balls. The developing sleeve is made of, advisably, a non-magnetic material such as stainless steel or aluminum alloy, of which stainless steel is preferred for its high wear resistance and other properties.

Here, the developing sleeve 41 is so structured that the magnet 41b housed inside it is stationary and the cylindrical sleeve 41a is rotatable; however, it may be so structured that the internal magnet 41b is rotatable and the sleeve 41a is stationary, or that both the internal magnet 41b and the sleeve 41a are rotatable (in the same direction or in the opposite directions).

An electrostatic latent image on the photoconductor (electrostatic latent image supporting member) may be developed by charged area development or by reversal development. The development may be achieved by contact development, in which the thin toner layer makes contact with the photoconductor, or by toner projection development (jumping development), in which they do not make contact with each other. To alleviate fogging, it is recommended to combine reversal development and toner projection development. In that case, the photoconductor is charged with the same polarity as the toner, and exposure removes the electric charge of the portion corresponding to the latent image. Moreover, in the developing section, an alternating voltage obtained by superimposing an alternating-current voltage on a direct-current voltage is applied, as a developing bias voltage, between the developing sleeve and the photoconductor. As a result, the toner on the developing sleeve jumps to and attaches to the discharged electrostatic latent image on the photoconductor, making the electrostatic latent image visible as a toner image.

The photoconductor used here may be made of any conventionally known material, examples including an amorphous silicon photoconductor, organic photoconductor, Se-based photoconductor, ZnO photoconductor, and CdS-based photoconductor. Among these, an amorphous silicon photoconductor is preferred for its high durability. The photoconductor may have any conventionally known shape, examples including a drum-like, sheet-like, belt-like, and web-like shape. Among these, a drum-like shape is preferred.

Figure 2:
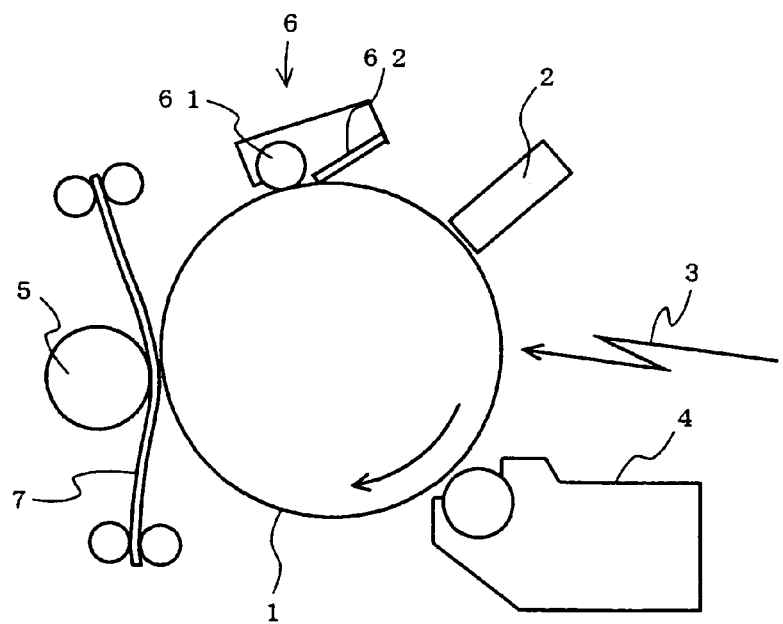
FIG. 2 is a sectional view showing an example of an image forming apparatus according to the invention.

Next, an image forming apparatus according to the invention will be described. FIG. 2 is a sectional view showing an example of an image forming apparatus according to the invention. The surface of a photoconductor 1 is charged uniformly with positive electric charge by a charging means 2. Next, an electrostatic latent image (exposed portion) is formed on the surface of the photoconductor 1 by an exposing means 3. Then, by the use of the developing apparatus 4 described above, the electrostatic latent image is sprinkled with toner from the thin toner layer formed on the developing sleeve having the magnet housed inside it, so that the electrostatic latent image is turned into a visible image. Then, the toner image on the photoconductor 1 is transferred to a transferred-image member 7 by a transferring means 5. Thereafter, the toner image on the transferred-image member 7 is subjected to heat and pressure by an unillustrated fixing means so as to be fused and fixed to the transferred-image member 7. On the other hand, the toner left on the photoconductor 1, i.e. the toner that has not been transferred, is roughly removed by a cleaning brush 61 and then completely removed by a cleaning blade 62. in a cleaning means 6.

EXAMPLES

Practical Example 1

Toner ingredients, specifically 100 parts by weight of styrene-acrylic resin serving as a binder resin, 5 parts by weight of a charge control agent, and 40 parts by weight of a magnetic powder (having an octahedral particle shape and an average particle diameter of 0.25 μm and containing 18% by weight of FeO), were put and mixed in a Henschel mixer, were then melt-kneaded in a twin-screw extruder, were then cooled in a drum flaker, and were then coarsely crushed on a hammer mill. The resultant granules were then finely crushed on a mechanical mill, and were then classified with a pneumatic classifier to obtain toner particles with a predetermined volume average particle diameter. These toner particles were blended with 0.6% by weight of silica (with a particle diameter of 0.012 μm), and were mixed through intense agitation in a Henschel mixer to obtain a magnetic toner that tends to be charged positively.

The bulk density of this magnetic toner was measured in the following manner, and the magnetic toner thus prepared was put in a high-speed printer to evaluate image reddishness, background fogging, partial fogging, initial image density, and image density sustenance. The results are shown in FIG. 1. The development was by non-contact development using as the photoconductor an amorphous silicon photoconductor, using a developing bias voltage obtained by superimposing a direct-current of 160 V on an alternating-current voltage with a frequency of 2.5 kHz and a peak-to-peak voltage of 1.9 kV, with the surface voltage of the latent image on the photoconductive drum set at 10 V in bright portions and 240 V in dark portions, and with the gap between the developing sleeve and the photosensitive drum set at 320 μm.

Measurement of the Bulk Density of the Toners 30 g of the toner was put in a container, from which the toner was quietly poured into a funnel with a sieve. With a 30 ml collecting container placed under the funnel, the toner on the sieve was stirred with a brush for 90 seconds to make the toner disperse and fall. Then, the weight of the toner collected in the collecting container was measured, and the bulk density of the toner was calculated according to the following formula:

$$\text{Bulk Density (g/cm}^3\text{)} = \text{Magnetic Toner Weight/Collecting Container Volume}$$

Evaluation of the Obtained Images

The magnetic toner prepared as described above was put in a high-speed printer structured as shown in FIG. 2 and capable of printing 50 sheets per minute, and image reddishness and initial background and partial fogging were evaluated under normal-temperature, normal-humidity conditions (20° C., 65 RH). Image reddishness and partial fogging were inspected visually. Partial fogging was inspected by measuring the density of a non-image area by using a reflection density meter (the model TC-6D manufactured by Tokyo Denshoku Co., Ltd., Japan). Background fogging was evaluated as follows: a concentration of 0.008 or lower was evaluated as "GOOD," and a concentration over 0.008 as "NG." Moreover, initial image concentration (in a solid black area of copied images) was measured under high-temperature, high-humidity conditions (35° C., 85 RH) by using a reflection density meter (the model TC-6D manufactured by Tokyo Denshoku Co., Ltd., Japan). Initial image density was evaluated as follows: a concentration of 1.2 or higher was evaluated as "GOOD," and any lower concentration as "NG."

ground and partial fogging were observed respectively. With the magnetic toner of Comparative Example 6, which had a low magnetic powder content, background fogging was observed. With the magnetic toner of Comparative Example 7, which had a high magnetic powder content, inadequate initial image density was observed under high-temperature, high-humidity conditions. With the magnetic toner of Comparative Example 8, which had a low magnetic powder content and did not fulfill formula (1), partial fogging was observed.

TABLE 1

|  | Bulk Density [g/cm$^3$] | Magnetic Iron Oxide Content [wt %] | A/B × 100 | Magnetic Iron Oxide Average Particle Diameter [μm] | FeO Content [wt %] | Reddish-ness | Back-ground Fogging | Partial Fogging | Initial Image Density, at High Temperature and Humidity | Image Density Sustenance |
|---|---|---|---|---|---|---|---|---|---|---|
| Practical Example 1 | 0.45 | 40 | 1.1 | 0.25 | 18 | GOOD | GOOD | GOOD | GOOD | GOOD |
| Practical Example 2 | 0.45 | 40 | 1.1 | 0.21 | 18 | GOOD | GOOD | GOOD | GOOD | GOOD |
| Practical Example 3 | 0.45 | 40 | 1.1 | 0.21 | 30 | GOOD | GOOD | GOOD | GOOD | GOOD |
| Practical Example 4 | 0.45 | 40 | 1.1 | 0.30 | 25 | GOOD | GOOD | GOOD | GOOD | GOOD |
| Practical Example 5 | 0.40 | 50 | 0.8 | 0.25 | 18 | GOOD | GOOD | GOOD | GOOD | FAIR |
| Practical Example 6 | 0.45 | 35 | 1.3 | 0.25 | 18 | GOOD | GOOD | GOOD | GOOD | GOOD |
| Practical Example 7 | 0.56 | 35 | 1.6 | 0.25 | 18 | GOOD | GOOD | GOOD | GOOD | FAIR |
| Comparative Example 1 | 0.45 | 40 | 1.1 | 0.14 | 25 | NG | GOOD | GOOD | GOOD | GOOD |
| Comparative Example 2 | 0.45 | 40 | 1.1 | 0.20 | 25 | NG | GOOD | GOOD | GOOD | GOOD |
| Comparative Example 3 | 0.45 | 40 | 1.1 | 0.25 | 15 | NG | GOOD | GOOD | GOOD | GOOD |
| Comparative Example 4 | 0.35 | 50 | 0.7 | 0.25 | 18 | GOOD | NG | GOOD | GOOD | FAIR |
| Comparative Example 5 | 0.59 | 35 | 1.7 | 0.25 | 18 | GOOD | GOOD | NG | GOOD | N/A(*) |
| Comparative Example 6 | 0.40 | 33 | 1.2 | 0.25 | 18 | GOOD | NG | GOOD | GOOD | GOOD |
| Comparative Example 7 | 0.62 | 52 | 1.2 | 0.25 | 18 | GOOD | GOOD | GOOD | NG | FAIR |
| Comparative Example 8 | 0.56 | 33 | 1.7 | 0.25 | 18 | GOOD | GOOD | NG | GOOD | N/A(*) |

(*)Bulk printing impossible because of partial fogging.

Image Density Sustenance

With the magnetic toner prepared as described above, bulk printing was performed to check whether an image density of 1.3 or higher was sustained after copying on 10,000 sheets, in which case image density sustenance was evaluates as "FAIR," and after copying on 20,000, in which case it was evaluated as "GOOD."

Practical Examples 2 to 7 and Comparative Examples 1 to 8

With toners prepared so as to contain different types of magnetic powder and have different bulk densities as shown in Table 1, images produced with them were evaluated in the same manner as with Practical Example 1.

Table 1 shows the following. With the magnetic toners of Practical Examples 1 to 7, which are magnetic toners according to the present invention, image reddishness was alleviated to such a degree as to be ignorable in practical terms, and no background or partial fogging was observed. Nor was observed inadequate initial image density under high-temperature, high-humidity conditions. Moreover, with any of these magnetic toners, an image density of 1.3 was sustained after bulk printing on 10,000 sheets. With the magnetic toners of Practical Examples 1 to 4 and 6, an image density of 1.3 was sustained after bulk printing on 20,000 sheets. By contrast, with the magnetic toners of Comparative Examples 1 and 2, which used magnetic powders having average particle diameters as small as 0.14 and 0.20 μm respectively, image reddishness was observed. Also with the magnetic toner of Comparative Example 3, of which the FeO content was as low as 15% by weight, image reddishness was observed. With the magnetic toners of Comparative Examples 4 and 5, which did not fulfill formula (1), back-

What is claimed is:

1. A method for developing an electrostatic latent image, comprising:
   (1) providing a developing apparatus containing:
      a developer section,
      a developer supporting member for supporting a developer and for transporting the developer to a developer section,
      a developing blade arranged at a predetermined distance from the developer supporting member so as to limit an amount of the developer transported to the developing section, and
      a magnet fitted on the developing blade, the magnet having a magnetic force of 400 to 800 gausses;
   (2) providing a developer that is a magnetic toner containing a binder resin and a magnetic powder, the magnetic powder being magnetic iron oxide having an octahedral particle shape and an average particle diameter of 0.21 μm or larger and containing 18% or more by weight of FeO, the magnetic toner having a bulk density A (g/cm$^3$) and a magnetic powder content B (% by weight) that fulfill the following formulae (1) and (2):

$$0.8 > A/B \times 100 < 1.6 \tag{1}$$

$$35 < B < 50, \tag{2}$$

(3) disposing the developer onto the developer supporting member;
   (4) using the developer supporting member to transport an amount of the developer to the developer section of the apparatus, said amount of the developer being limited by the developing blade being arranged at the predetermined distance from the developer supporting member; and (5) using the developer to develop an electrostatic latent image on a photoreceptor.

2. A method as claimed in claim 1, wherein in the developing apparatus provided in step (1), the distance between the developer supporting member and the developing blade is in a range of from 0.2 to 0.4 mm.

3. A method as claimed in claim 1, wherein in the developing apparatus provided in step (1), the developer supporting member has a surface roughness in a range of from 3.0 to 5.5 µm.

4. A method as claimed in claim 1, wherein in the developing apparatus provided in step (1), the developer supporting member is formed out of stainless steel.

5. A method for developing an electrostatic latent image, comprising:
(A) providing an image forming apparatus comprising:
  (1) an image supporting member;
  (2) a charging means for charging a surface of the image supporting member with electric charge;
  (3) an exposing means for irradiating the charged surface of the image supporting member with light to form an electrostatic latent image;
  (4) a developing means for developing the electrostatic latent image, the developing means comprising:
    a developer section,
    a developer supporting member for supporting a developer and for transporting the developer to the developer section,
    a developing blade arranged at a predetermined distance from the developer supporting member so as to limit an amount of the developer transported to the developing section, and
    a magnet fitted on the developing blade, the magnet having a magnetic force of 400 to 800 gausses; and
  (5) a transferring means for transferring a developer on the image supporting member to a transferred-image member;
(B) providing a developer that is a magnetic toner containing a binder resin and a magnetic powder, the magnetic powder being magnetic iron oxide having an octahedral particle shape and an average particle diameter of 0.21 µm or larger and containing 18% or more by weight of FeO, the magnetic toner having a bulk density A (g/cm$^3$) and a magnetic powder content B (% by weight) that fulfill the following formulae (1) and (2):

$$0.8 > A/B \times 100 < 1.6 \tag{1}$$

$$35 < B < 50, \tag{2}$$

(C) using said charging means to charge a surface of the image supporting member with electric charge;
(D) using the exposing means to irradiate the charged surface of the image supporting member with light to form an electrostatic latent image;
(E) feeding the developer to the image supporting member;
(F) developing the electrostatic latent image on the image supporting member; and
(G) using the transferring means to transfer the developer from the image supporting member to the transferred-image member.

6. A method as claimed in claim 5, wherein, in the image-forming apparatus provided in step (A), a distance between the image supporting member and the developer supporting member is greater than a thickness of a thin layer of the magnetic toner formed on the developer supporting member, and development of the electrostatic latent image is achieved by feeding the developer thereto with an alternating-current bias voltage applied between the image supporting member and the developer supporting member.

7. A method as claimed in claim 5, wherein, in the developing means of the image-forming apparatus provided in step (A), development of the electrostatic latent image is achieved by charging the magnetic toner with electric charge of a same polarity as an unexposed portion of the image supporting member, and attaching the charged magnetic toner to an exposed portion of the image supporting member.

8. A method as claimed in claim 5, wherein, in the image-forming apparatus provided in step (A), the image supporting member is an amorphous silicon photoconductor.

* * * * *

UNITED STATES PATENT AND TRADEMARK OFFICE
CERTIFICATE OF CORRECTION

PATENT NO. : 7,132,211 B2
APPLICATION NO. : 11/221934
DATED : November 7, 2006
INVENTOR(S) : Sugimoto et al.

It is certified that error appears in the above-identified patent and that said Letters Patent is hereby corrected as shown below:

In column 10, line 57, change "$0.8 > A/B \times 100 < 1.6$" to --$0.8 \leq A/B \times 100 \leq 1.6$--.
In column 10, line 59, change "$35 < B < 50$" to --$35 \leq B \leq 50$--.
In column 12, line 6, change "$0.8 > A/B \times 100 < 1.6$" to --$0.8 \leq A/B \times 100 \leq 1.6$--.
In column 12, line 8, change "$35 < B < 50$" to --$35 \leq B \leq 50$--.

Signed and Sealed this

Eighth Day of May, 2007

JON W. DUDAS
*Director of the United States Patent and Trademark Office*